United States Patent
Gillanders et al.

(10) Patent No.: US 7,856,309 B2
(45) Date of Patent: Dec. 21, 2010

(54) COLD START EMISSION REDUCTION STRATEGY FOR COORDINATED TORQUE CONTROL SYSTEMS

(75) Inventors: Christopher A Gillanders, Royal Oak, MI (US); John L. Lahti, Novi, MI (US); Louis A. Avallone, Milford, MI (US); Jon C. Miller, Fenton, MI (US); Robert C. Simon, Jr., Brighton, MI (US); Todd R. Shupe, Milford, MI (US); Jaehak Jung, Pittsford, NY (US); William R. Cawthorne, Milford, MI (US); Leonard G. Wozniak, Ann Arbor, MI (US)

(73) Assignee: GM Global Technology Operations, Inc.

( * ) Notice: Subject to any disclaimer, the term of this patent is extended or adjusted under 35 U.S.C. 154(b) by 215 days.

(21) Appl. No.: 12/233,886

(22) Filed: Sep. 19, 2008

(65) Prior Publication Data
US 2010/0075802 A1 Mar. 25, 2010

(51) Int. Cl.
G05D 17/02 (2006.01)
F01N 9/00 (2006.01)
F02D 43/00 (2006.01)
F02D 41/02 (2006.01)
F01N 11/00 (2006.01)

(52) U.S. Cl. .......... 701/113; 701/102; 60/274; 477/98

(58) Field of Classification Search ......... 701/102, 701/103, 113; 60/274; 477/98
See application file for complete search history.

(56) References Cited

U.S. PATENT DOCUMENTS

| 5,623,906 | A | * | 4/1997 | Storhok | 123/406.23 |
| 5,815,828 | A | * | 9/1998 | Nankee et al. | 701/109 |
| 2003/0177761 | A1 | * | 9/2003 | Wagner et al. | 60/284 |
| 2005/0027431 | A1 | * | 2/2005 | Todoroki et al. | 701/105 |
| 2006/0156710 | A1 | * | 7/2006 | Pott | 60/285 |
| 2008/0133115 | A1 | * | 6/2008 | Asano et al. | 701/113 |
| 2009/0118091 | A1 | * | 5/2009 | Lahti et al. | 477/100 |
| 2009/0150059 | A1 | * | 6/2009 | Santoso et al. | 701/113 |

* cited by examiner

Primary Examiner—Stephen K Cronin
Assistant Examiner—Arnold Castro

(57) ABSTRACT

A cold-start control system for an internal combustion engine includes a heat estimation module, a torque request module and a propulsion torque determination module. The heat estimation module determines an exhaust system temperature and estimates heat required to heat an exhaust system to a predetermined temperature. The torque request module generates a torque request based on the estimated heat. The propulsion torque determination module determines a desired engine torque based on the torque request.

15 Claims, 4 Drawing Sheets

COLD START EMISSION REDUCTION STRATEGY FOR COORDINATED TORQUE CONTROL SYSTEMS

FIELD

The present disclosure relates to internal combustion engines, and more particularly to cold-start control systems for internal combustion engines to reduce cold-start emissions.

BACKGROUND

The background description provided herein is for the purpose of generally presenting the context of the disclosure. Work of the presently named inventors, to the extent that it is described in this background section, as well as aspects of the description that may not otherwise qualify as prior art at the time of filing, are neither expressly nor impliedly admitted as prior art against the present disclosure.

Catalytic converters may be used to reduce emissions. Generally, the catalytic converters are more efficient at elevated temperatures. For example, "a light-off temperature" is a point where the conversion of carbon monoxide (CO), unburned hydrocarbons (HC), and nitride oxides ($NO_x$) has reached 50% efficiency. To more quickly increase the temperature of a catalytic converter, ignition timing may be retarded to generate more heat to the exhaust gas during the engine cold start period. The ignition timing retardation is generally achieved by shifting the spark timing from a point where the engine outputs a desired torque. Due to the spark timing shift, the engine may not output the desired engine torque.

SUMMARY

Accordingly, a cold-start control system for an internal combustion engine includes a heat estimation module, a torque request module, and a propulsion torque determination module. The heat estimation module determines an exhaust system temperature, and estimates heat required to attain a predetermined temperature for an exhaust system. The torque request module generates a torque request based on the estimated heat. The propulsion torque determination module determines a desired engine torque based on the torque request.

In other features, the exhaust system temperature may be a catalytic converter bed temperature. The predetermined temperature may be a light-off temperature.

A method of controlling an engine during engine cold-start includes determining an exhaust system temperature, estimating heat required to attain a predetermined temperature for an exhaust system, generating a torque request based on the estimated heat, and determining a desired engine torque based on the torque request.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
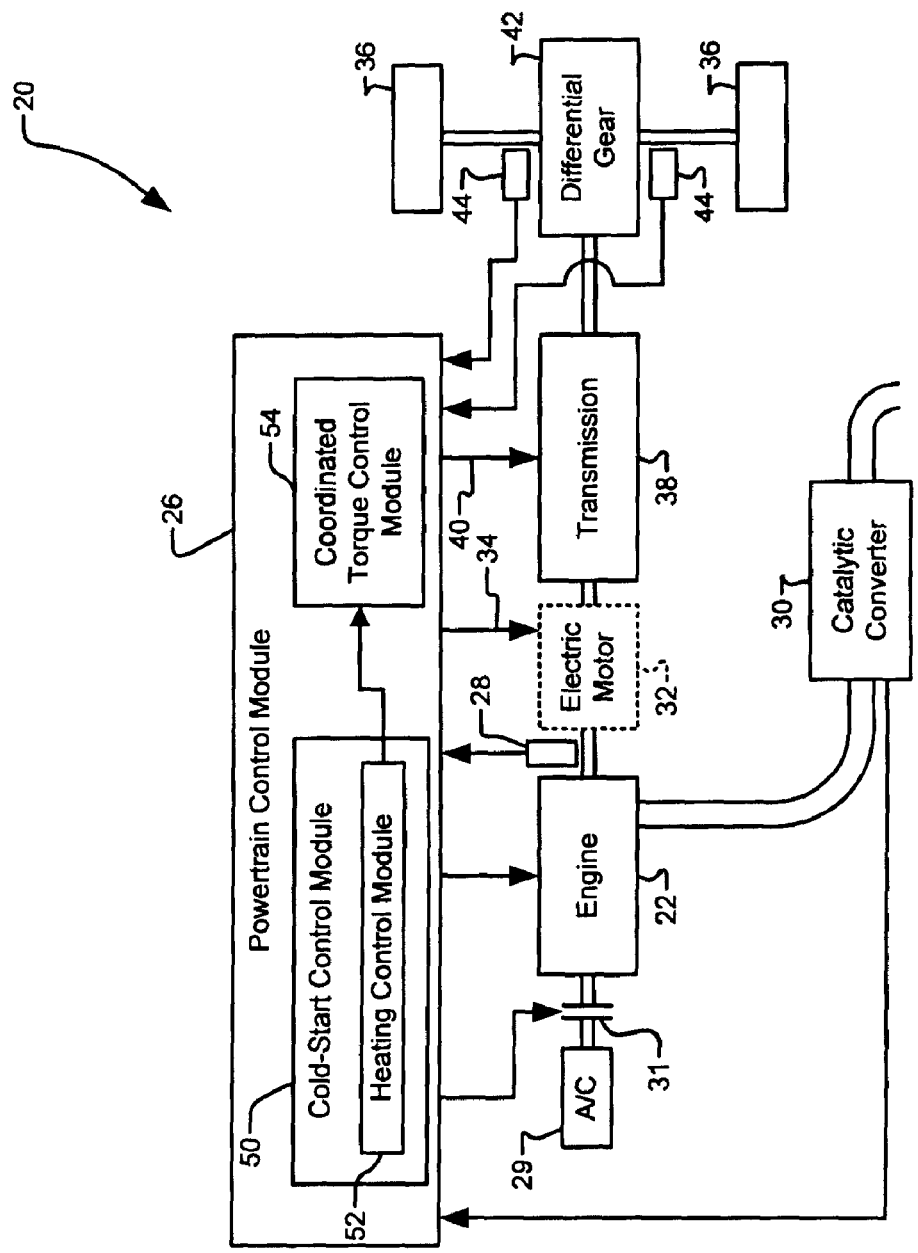
FIG. 1 is a block diagram of a vehicle powertrain according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

A cold-start control module according to the present disclosure includes a heating control module that estimates an amount of heat required to heat a catalytic converter during engine cold start. The estimated heat is converted into a torque value. The heating control module makes a torque request based on the torque value. A propulsion torque determination module determines a desired engine torque based on a plurality of torque requests including the torque request from the heating control module.

Referring now to FIG. 1, a vehicle powertrain 20 includes an internal combustion engine 22 that develops torque. The amount of torque is established by one or more actuators (not shown) that control at least one of fuel, ignition, residual exhaust gas or exhaust recirculation (EGR), number of cylinders firing, and air flow, to the engine 22 in accordance with commands from a powertrain control module (PCM) 26. The engine 22 may be a diesel engine or a gasoline engine. A crankshaft position sensor 28 generates a signal that indicates a speed of engine 22. Exhaust from the engine 22 passes through a catalytic converter 30. Torque from the engine 22 can be used for driving accessory loads. An air conditioning compressor 29 is an example of an accessory load. PCM 26 can employ a compressor clutch 31 to selectively couple and decouple the air conditioning compressor 29 from the engine torque. Other examples of accessory loads include an alternator, a power steering pump, an air pump, and the like.

The powertrain 20 may also include an electric motor 32 that provides torque in accordance with a torque command 34 from the PCM 26. The torque of the electric motor 32 can be combined with the torque of the engine 22 to provide power for the powertrain 20. While the electric motor 32 is shown coupled in series with the torque output of the engine 22, it should be appreciated that other configurations are also contemplated to be within the scope of this description. For example, the electric motor 32 may be implemented as one or more electric motors that provide torque directly to wheels 36 instead of passing through a transmission 38.

The combined torque of the engine 22 and the electric motor 32 is applied to the transmission 38. The transmission 38 may be an automatic transmission that switches gears in accordance with a gear change command 40 from PCM 26. An output shaft of transmission 38 is coupled to an input of a differential gear 42. The differential gear 42 drives axles and wheels 36. A wheel speed sensors 44 generate signals that indicate a rotation speed of their respective wheels 36.

The PCM 26 includes a cold-start control module 50 that generates a torque request based on exhaust system temperature. The cold-start control module 50 may include a heating control module 52 that communicates with the catalytic converter 30. The heating control module 52 may be actuated when the cold-start control module 50 determines that the temperature of the catalytic converter 30 is below a threshold temperature. The heating control module 52 communicates with a coordinated torque control module 54.

Figure 2:
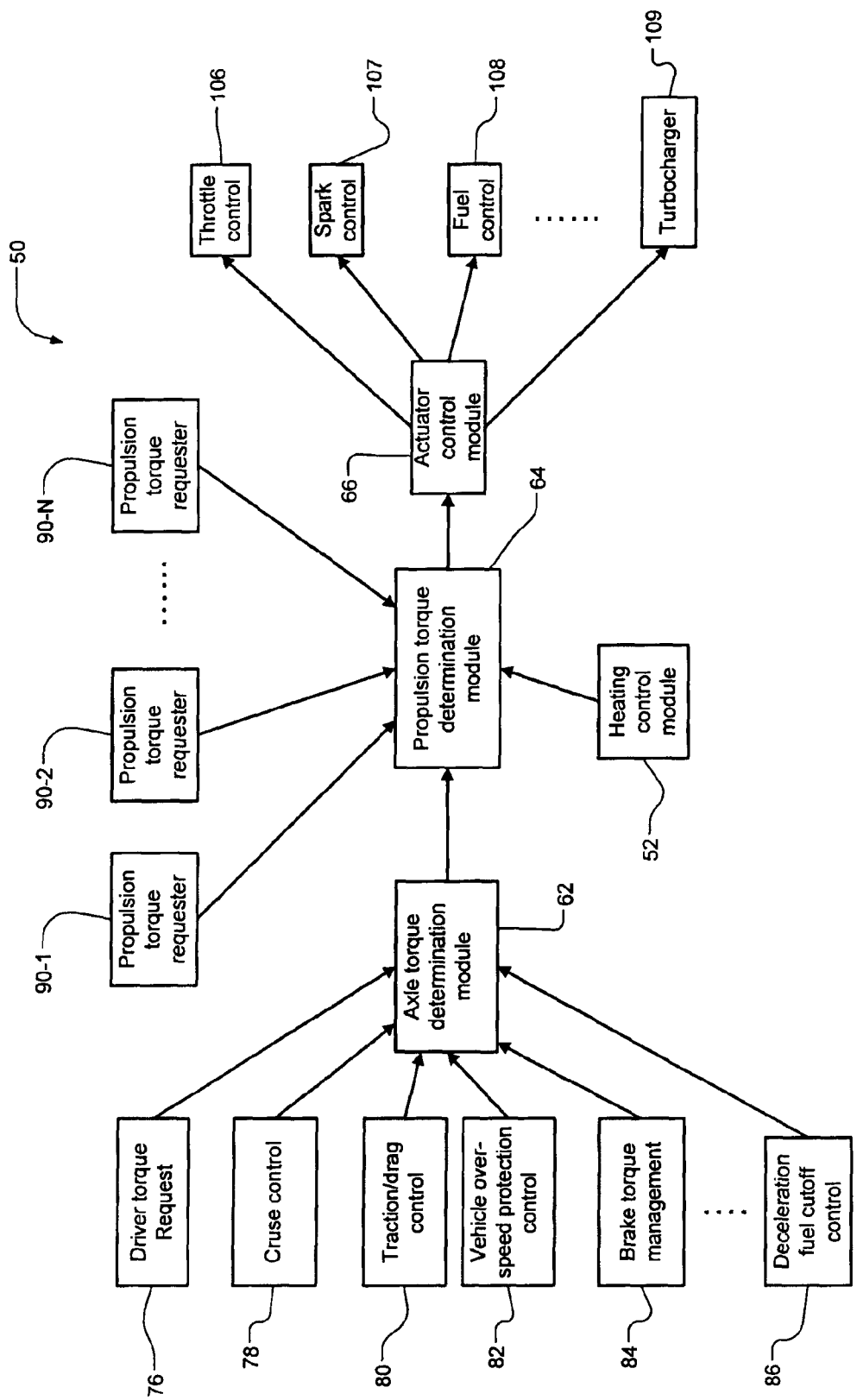
FIG. 2 is a block diagram of a coordinated torque control module that communicates with a heating control module according to the present disclosure.

Referring now to FIG. 2, the coordinated torque control module 54 may include an axle torque determination module 62, a propulsion torque determination module 64, and an actuator control module 66. The heating control module 52 communicates with the propulsion torque determination module 64. The axle torque determination module 62 determines a desired axle torque based on a plurality of torque requests sent to the axle torque determination module 62. The propulsion torque determination module 64 determines a desired propulsion torque (or a desired engine torque) based on the desired axle torque and a plurality of torque requests sent to the propulsion torque determination module 64. The actuator control module 66 controls a plurality of actuators and consequently the operation of the engine 22 (and the motor 34) to output the desired propulsion torque.

More specifically, the axle torque determination module 62 may receive a plurality of torque requests at axle level, including but not limited to, a driver torque request 76, cruise control 78, traction/drag control 80, vehicle over-speed protection control 82, brake torque management 84, and deceleration fuel cutoff control 86.

The driver torque request 76 is made through, for example only, an accelerator pedal. Cruise control 78 is a second set of driver inputs and may be arbitrated against the driver request through the accelerator pedal. Traction/drag control 80 controls positive/negative wheel slip. Wheel slip is controlled through acceleration/deceleration of the wheel speed. Vehicle over-speed protection control 82 protects against excessive vehicle speed. Brake torque management 84 limits the propulsion system from being able to overcome the brakes if the driver is depressing the brake pedal. The deceleration fuel cut-off control 86 disables combustion torque and goes to full engine off torque when the desired axle torque is less than what can be achieved by minimizing the combustion torque through normal means.

The axle torque determination module 62 sums the torque requests from these torque requesters 76, 78, 80, 82, 84, 86 and determines a desired axle torque request. A signal corresponding to the desired axle torque is sent to the propulsion torque determination module 64 as one of a plurality of propulsion torque requests.

The propulsion torque determination module 64 may receive a plurality of propulsion torque requests from a plurality of propulsion torque requesters 90-1, 90-2, . . . 90-N and the desired axle torque request from the axle torque determination module 62. The propulsion torque determination module 64 may also receive a torque request from the heating control module 52 when the heating control module 52 is activated. The heating control module 52 may be selectively activated to make a torque request when the exhaust system is below a threshold temperature.

Some of the torque requests (whether axle torque requests or propulsion torque requests) may include an absolute torque and a reserve torque (delta torque) when making a torque request. The absolute torque is used to achieve a desired function. The torque reserve is the amount of torque available beyond the desired engine torque output at the current operating conditions. The torque reserve represents variable loads to the engine. The variable loads may change the engine torque levels quickly, but do not change the absolute engine torque. The torque reserve may be established to maintain an engine speed above a predetermined minimum speed in the event of a large, unanticipated torque load on the engine. A device that makes a torque reserve request may respond to a torque increase more quickly.

Torque reserves may be either additive reserves or minimum reserves. Additive reserves are required for torque increase response and thus must be summed. Minimum reserves are not used for torque increase response. Therefore, a device that makes the minimum reserve requests can use existing reserves for desired functions.

Figure 3:
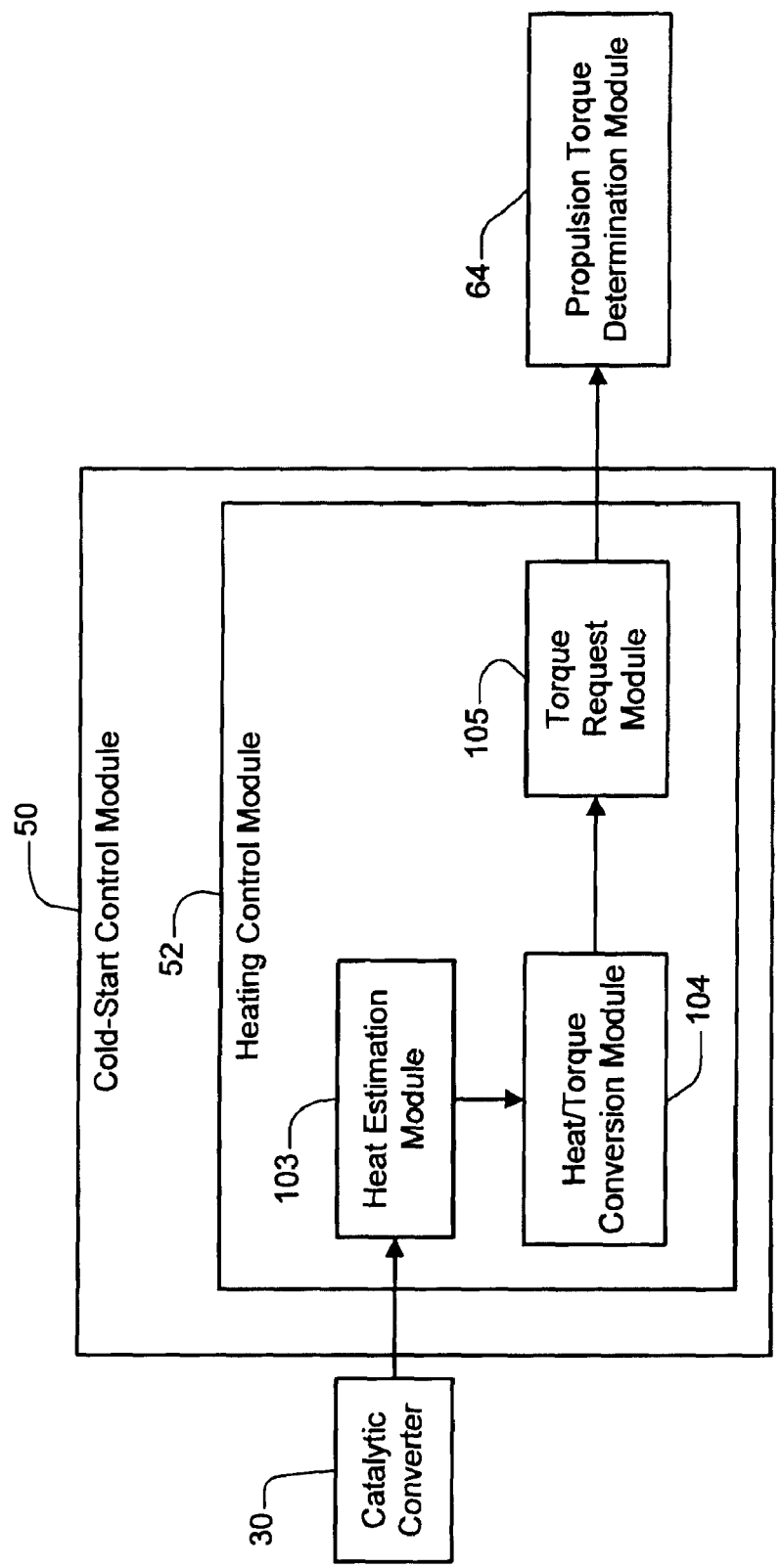
FIG. 3 is a block diagram of a cold-start control module that includes a heating control module according to the present disclosure.

Referring to FIG. 3, the cold-start control module 50 includes the heating control module 52. The heating control module 52 includes a heat estimation module 103, a heat/torque conversion module 104, and a torque request module 105. The heat estimation module 103 estimates the temperature of the exhaust system (for example only, the catalytic converter bed temperature), and estimates heat required to heat the catalytic converter 30. It is noted that temperature of components in the exhaust system other than the catalytic converter 30 may be used to estimate the heat required to heat the exhaust system. The heat/torque conversion module 104 communicates with the heat estimation module 103 and the torque request module 105 and converts the estimated heat into a torque value. The torque request module 105 communicates with the propulsion torque determination module 64 and makes a torque request to the propulsion torque based on the torque value.

The heating control module 52 may be activated when the catalytic converter is in cold-start conditions. The cold-start conditions are present, for example only, when the temperature of the exhaust gas, the exhaust system (i.e., the catalytic converter), or the engine coolant temperature is below a threshold temperature. The threshold temperature may be a temperature equal to or below the light-off temperature of the catalytic converter. The light-off temperature is a temperature where conversion of emissions achieves a predetermined efficiency (for example only, 50%). When the heating control module 52 is activated, the heat estimation module 103 may estimate an amount of heat required to attain a predetermined temperature (for example only, the light-off temperature) for the exhaust system and consequently the catalytic converter 30. The heat/torque conversion module 104 then converts the estimated heat into a torque value. The torque request module 105 then makes a torque request to the propulsion torque determination module 64 based on the torque value. The torque request may be a torque reserve request, particularly in the form of a minimum reserve.

After the propulsion torque determination module 64 determines a predicted propulsion torque, the torque request from the heating control module 52 is added to the predicted propulsion torque to achieve a desired propulsion torque. The torque reserve request from the heating control module 52 does not change the predicted absolute torque. The torque reserve request from the heating control module 52 only affects spark timing. To compensate for the loss in torque due to spark timing retardation, airflow may be increased to achieve the desired propulsion torque output.

Referring back to FIG. 2, after the propulsion torque determination module 64 determines a desired propulsion torque output, a signal indicating the desired torque output may be sent to the actuator control module 66. The actuator control module 66 controls the plurality of actuators to achieve a propulsion torque output. The plurality of actuators may include, but are not limited to, a throttle control 106, a spark control 107, fuel control 108, a turbocharger 109. The actuator control module 66 determines an optimum throttle position, spark timing, fuel quantity, intake pressure, and motor torque to obtain the desired torque output. Variable engine torque and motor torque may be outputted by controlling these actuators 106, 107, 108, 109 to change the throttle position, the spark timing, the fuel quantity and the intake pressure.

Generally, the desired torque reserve depends on engine speed, predicted airflow, the predicted propulsion torque, vehicle speed, effective pedal position, converter temperature, and engine run time. The torque reserve request from the heating control module 52 may be determined as a function of the predicted propulsion torque and the engine speed. The reserve torque that is used to provide heating to the catalytic converter may be adjusted based on engine run time, coolant temperature, and the temperature of the catalytic converter. The reserve torque for cold-start heating may be ramped-in/out to prevent noticeable step changes in torque delivery. When the cold-start conditions cease to exist, the heating control module 52 may be de-activated to stop sending a reserve torque request to the propulsion torque determination module 64. The cold-start conditions cease to exist, for example only, when the engine has run for a predetermined period of time, or when the temperature of the catalytic converter or the engine coolant temperature has reached a predetermined temperature.

Figure 4:
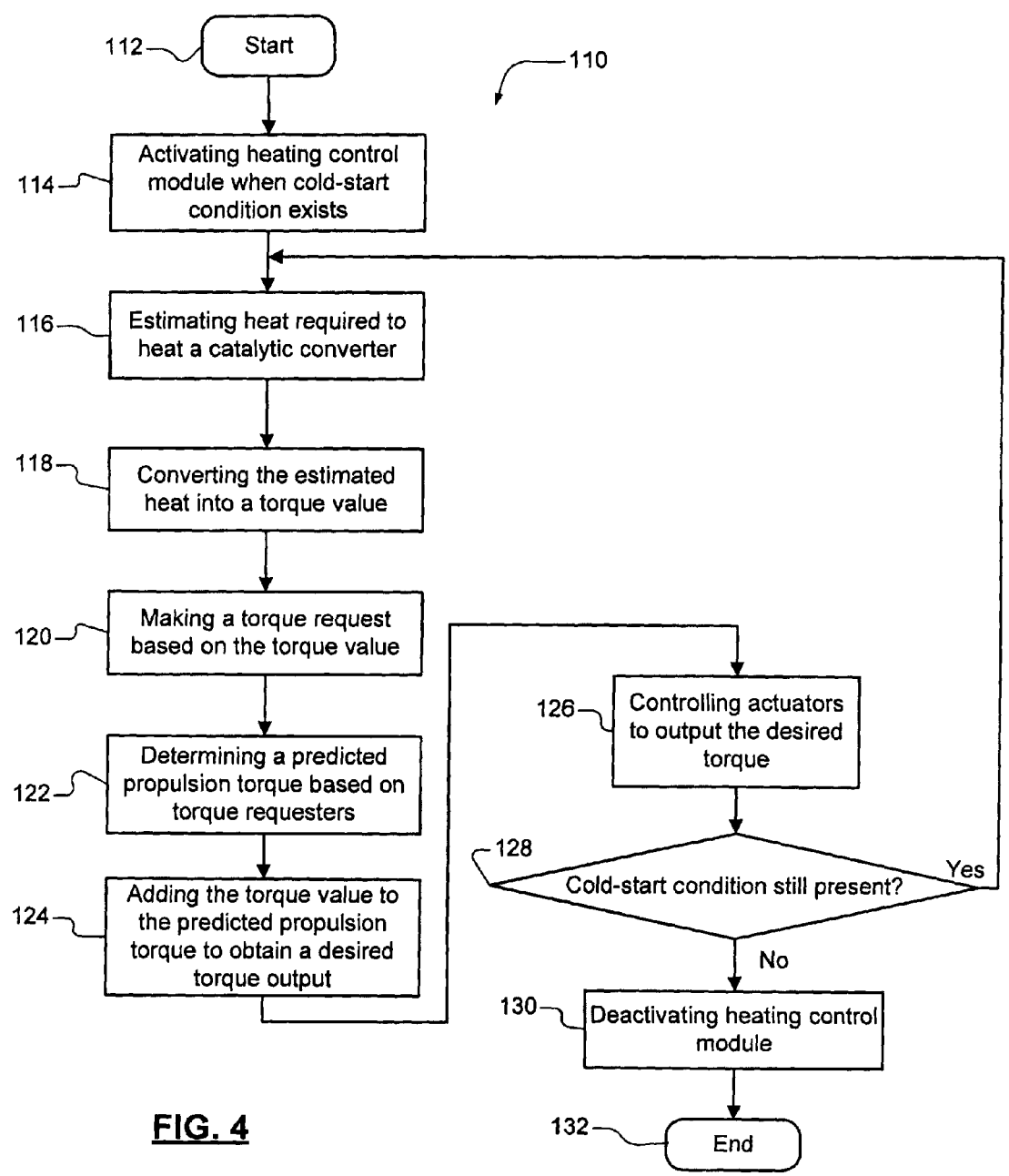
FIG. 4 is a flow diagram of a method of operating an engine during engine cold-start according to the present disclosure.

Referring to FIG. 4, a method 110 of operating an engine starts in step 112. The cold-start control module activates the heating control module in step 114 when temperature of the engine coolant or the catalytic converter is below a threshold temperature. The heat estimation module 103 of the heating control module 52 estimates the amount of heat required to heat the exhaust system (particularly the catalytic converter) to a predetermined temperature in step 116. The required amount of heat depends on the engine operating conditions. The heat/torque conversion module 104 of the heating control module 52 then converts the estimated heat into a torque value in step 118. The torque request module 105 then makes a torque request based on the torque value in step 120. The torque request from the heating control module 52 is in the form of a torque reserve.

Next, the propulsion torque determination module 64 determines a predicted propulsion torque based on a plurality of torque requests other than the torque reserve request from the heating control module 52 in step 122. The propulsion torque determination module 64 then adds the torque reserve request to the predicted propulsion torque to obtain a final desired torque output in step 124. The actuator control module 66 then controls actuators to output the desired torque in step 126. The cold-start control module continuously monitors the temperature of the exhaust system to determine whether the cold-start condition are still present in step 128. When the cold-start conditions are not present, the cold-start control module may deactivate the heating control module in step 130. The torque reserve is ramped back to zero. The method 110 ends at step 132.

The cold-start control module according to the present disclosure allows the estimated heat for heating the exhaust system to be converted into a torque request that is included in the final desired engine torque. The actuator control module 66 may adjust the ignition timing, fuel quantity and air flow based on the final desired engine torque. As such, the cold-start control module may operate the engine torque to obtain the desired torque output and the estimated heat without compromising a driver's observed drive quality.

Further, the cold-start control module in accordance with the teachings of the present disclosure allows for easy integration of new hardware that requires engine torque for proper functioning. Because all the components that require an engine torque are arbitrated in a torque domain, errors in translating between torque and air domains can be minimized.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A cold-start control system for an internal combustion engine comprising:
   a heat estimation module that determines an exhaust system temperature and that estimates heat required to heat an exhaust system to a predetermined temperature; and
   a torque request module that generates a torque request based on the heat; and
   a propulsion torque determination module that determines a desired engine torque based on the torque request.

2. The cold-start control system of claim 1 further comprising a heat/torque conversion module that converts the estimated heat into a torque value.

3. The cold-start control system of claim 2 wherein the torque request module generates the torque request based on the torque value.

4. The cold-start control system of claim 3 wherein the torque request corresponds to a torque reserve.

5. The cold-start control system of claim 4 wherein the torque reserve is a function of an engine speed and the desired engine torque.

6. The cold-start control system of claim 2 further comprising a heating control module that includes the heat estimation module, the heat/torque conversion module, and the torque request module.

7. The cold-start control system of claim 6 wherein the heating control module is actuated when the exhaust system temperature is below a threshold temperature.

8. The cold-start control system of claim 6 wherein the heating control module is deactivated after the exhaust system reaches a light-off temperature.

9. The cold-start control system of claim 6 wherein the heating control module is deactivated after the engine has run for a predetermined period of time.

10. The cold-start control system of claim 6 wherein the predetermined temperature is a light-off temperature.

11. A method of controlling an engine during engine cold-start comprising:
    determining an exhaust system temperature;
    estimating heat required to heat an exhaust system to a predetermined temperature;
    generating a torque request based on the heat; and
    determining a desired engine torque based on the torque request.

12. The method of claim 11 further comprising converting the heat into a torque value.

13. The method of claim 11 wherein the torque request corresponds to a torque reserve.

14. The method of claim 13 wherein the torque reserve is a function of the desired engine torque and an engine speed.

15. The method of claim 11 wherein the predetermined temperature is a light-off temperature.

* * * * *